US009787096B2

(12) United States Patent
Alteneiji

(10) Patent No.: US 9,787,096 B2
(45) Date of Patent: Oct. 10, 2017

(54) OVERALL DYNAMIC REACTIVE POWER CONTROL IN TRANSMISSION SYSTEMS

(71) Applicant: Hamad Musabeh Ahmed Saif Alteneiji, Sharjah (AE)

(72) Inventor: Hamad Musabeh Ahmed Saif Alteneiji, Sharjah (AE)

(73) Assignee: Hamad Musabeh Ahmed Saif Alteneiji, Sharjah (AE)

( * ) Notice: Subject to any disclaimer, the term of this patent is extended or adjusted under 35 U.S.C. 154(b) by 0 days.

(21) Appl. No.: 14/526,130

(22) Filed: Oct. 28, 2014

(65) Prior Publication Data

US 2016/0118878 A1  Apr. 28, 2016

(51) Int. Cl.
*H02M 1/42* (2007.01)
*H02J 3/18* (2006.01)

(52) U.S. Cl.
CPC .............. *H02J 3/18* (2013.01); *H02J 3/1821* (2013.01); *Y02E 40/30* (2013.01)

(58) Field of Classification Search
CPC ... H02M 1/12; H02M 1/42; G05F 1/70; H02J 3/16; H02J 3/01; H02J 3/24; H02J 3/12
(Continued)

(56) References Cited

U.S. PATENT DOCUMENTS 3,936,727 A * 2/1976 Kelley, Jr. ............ G01R 15/142
                                                    323/210
3,968,432 A * 7/1976 Kelley, Jr. ............ G01R 15/142
                                                    324/107
(Continued)

FOREIGN PATENT DOCUMENTS

CN    103248046 A  *  8/2013

OTHER PUBLICATIONS

Power compensators based on Magentically controlled shunt reactors in electric networks with a voltage between 110kV and 500kV—A. Bryantsev et al. 2010 IEEE/PES Transmission and Distribution conference and expositions.*

(Continued)

*Primary Examiner* — Adolf Berhane
(74) *Attorney, Agent, or Firm* — MH2 Technology Law Group, LLP

(57) ABSTRACT

There is provided a method of stabilizing the voltage and reducing power losses in an electric network having a flow of live current and a flow of reactive power, the method comprising reducing the flow of live current by controlling the flow of reactive power within the network. There is also provided an electric network node having a first load point and a second load point, the second load point being at a lower load level than the first load point, the node comprising a reactive power absorber at the first load point and a reactive power generator at the lower load point. An electric network comprising a first substation comprising a first load bus-bar having a first voltage and a second load bus-bar having a second voltage lower than the first voltage; second substations in connection with the first substation, each one comprising a third load bus-bar having a third voltage equal to the second voltage and a fourth load bus-bar having a fourth voltage lower than the third voltage; a reactive power absorber connected to the second load bus-bar; and for each one of the second substations, a reactive power generator connected to the fourth bus-bar.

10 Claims, 7 Drawing Sheets

(58) Field of Classification Search
USPC .................... 323/205–208; 307/102, 105
See application file for complete search history.

(56) References Cited

U.S. PATENT DOCUMENTS

| | | | | | |
|---|---|---|---|---|---|
| 4,719,402 | A | * | 1/1988 | Brennen | H02J 3/1828 323/206 |
| 5,262,677 | A | * | 11/1993 | Ramirez | H02J 3/01 307/102 |
| 6,172,863 | B1 | * | 1/2001 | Ito | H01H 33/593 323/908 |
| 7,200,500 | B2 | * | 4/2007 | Larsson | H02J 3/00 307/105 |
| 7,692,415 | B2 | * | 4/2010 | Yasuda | G05F 1/70 307/105 |
| 8,648,576 | B2 | * | 2/2014 | Matsuda | H02J 3/1878 307/105 |
| 2011/0313591 | A1 | * | 12/2011 | Andresen | F03D 7/028 700/298 |
| 2011/0320058 | A1 | * | 12/2011 | Rietmann | H02J 3/006 700/297 |
| 2012/0326503 | A1 | * | 12/2012 | Birkelund | G06Q 10/04 307/24 |
| 2014/0249688 | A1 | * | 9/2014 | Ansari | H02J 3/46 700/297 |

OTHER PUBLICATIONS

Reactive power compensation for transmission and distribution systems by Dale Dudney, HVT powe systems—Sep. 2012.*

* cited by examiner

OVERALL DYNAMIC REACTIVE POWER CONTROL IN TRANSMISSION SYSTEMS

FIELD OF THE INVENTION

The present invention relates to reduction of power losses and stabilization of voltage in electric networks, including transmission and distribution networks, through effective reactive power control.

BACKGROUND OF THE INVENTION

The power losses in electric network represent significant part from the consumed energy in entire electrical system and estimated by few percents (3-10%) from the total generated power. The major part of energy lost in the electric network dissipated as heat energy which affects the performance and expected life of electrical network elements like transformers, cables and switchgears. There is a considerable heat and greenhouse gases release to atmosphere coming out from production of power in power plants to cover power losses which contribute to global warming that causes climate changes and associated phenomena.

Many of researches have been conducted and many of techniques have been applied to solve this problem (power losses). One of the most famous techniques is related to reactive power control like Flexible AC Transmission Systems (FACTS). Although these techniques might help to reduce power losses and save energy, however it is not their first priority. They are mainly focusing on improving and stabilizing the critical parameters of the network more than saving of energy from reduction of power losses. The main objective of these technologies is to tackle critical situation of transmission network like voltage stabilization, power system stability and power system quality issues which all are essential for power transfer reliability of transmission network. The energy service provider can bear the cost of some power losses in the system but never with anything affecting supply continuity and power system stability.

A common thing in all these techniques is that they are connected to one node or one substation in the system to either deliver the shortage of reactive power or absorb the surplus of reactive power in order to raise the voltage or reduce the voltage respectively. The injection of reactive power in specific node in power system will not help a lot in relieving the network form reactive power flow, so does not help to reduce power losses effectively.

SUMMARY OF THE INVENTION

A new approach is being developed to treat all transmission network related aspects of power system reliability parameters as well as power losses reduction in more efficient and cost effective way.

As a first aspect of the invention, there is provided a method of reducing power losses and stabilizing voltage in an electric network having a flow of live current and a flow of reactive power, the method comprising reducing the flow of live current by controlling the flow of reactive power within the network.

Preferably, the controlling the flow of reactive power comprises absorbing excess reactive power for reducing excess in reactive power flow and voltage at a first load point of the network.

Preferably, the method further comprises generating additional reactive power for compensating shortage in reactive power and raise the voltage at a second load point of the network, the second load point being at a lower load voltage level than the first load point.

Preferably, the absorption and generation of reactive power are conducted respectively using a reactive power absorber and a reactive power generator.

Preferably, in the method, the reactive power absorber is a magnetically controlled shunt reactor (MCSR) and the reactive power generator is an automatic capacitor bank (ACB).

Preferably, in the method, the electric network is a transmission network in connection with a power generator, wherein the first load point is at a lower load level than the power generator.

Preferably, in the method, the electric network is a transmission network in connection with a distribution network comprising a distribution substation, wherein the second load point is at a higher load level than the distribution substation.

Preferably, in the method, the first load point and the second load point are respectively at a first transmission substation and at a second transmission substation of the electric transmission network.

Preferably, in the method, the first transmission substation comprises a first load bus-bar having a first voltage and a second load bus-bar having a second voltage lower than the first voltage, wherein the first load point is connected to the second load bus-bar.

Preferably, in the method, the second transmission substation comprises a third load bus-bar having a third voltage and a fourth load bus-bar having a fourth voltage lower than the third voltage, wherein the second load point is connected to the fourth load bus-bar.

Preferably, in the method, the first transmission substation is 220/132 Kilovolts (KV) and the second transmission substation is 132/33 KV, the second voltage of the second load bus-bar being 132 Kilovolts and the fourth voltage of the fourth load bus-bar being 33 KV.

Preferably, in the method, the first substation has first substation transformers and the second substation has second substation transformers, wherein the MCSR absorbs the excess reactive power generated naturally over feeders between the second load bus-bar and the third load bus-bar of the second transmission substation, and wherein the ACB generates the additional reactive power to flow in the fourth bus-bar in the direction of the second substation transformers and the distribution substation.

Preferably, the electric network is at least one of a transmission and distribution network.

As a further aspect of the invention, there is provided an electric network node having a first load point and a second load point, the second load point being at a lower load level than the first load point, the node comprising a reactive power absorber at the first load point and a reactive power generator at the lower load point.

Preferably, the reactive power absorber is a magnetically controlled reactor shunt (MCSR) and the reactive power generator is an automatic capacitor bank (ACB).

Preferably, the electric network is a transmission network in connection with a power generator, wherein the first load point is at a lower load level than the power generator.

Preferably, the electric network is a transmission network in connection with a distribution network comprising a distribution substation, wherein the second load point is at a higher load level than the distribution substation.

Preferably, the first load point and the second load point are respectively at a first transmission substation and at a second transmission substation of the electric transmission network.

Preferably, the first transmission substation comprises a first load bus-bar having a first voltage and a second load bus-bar having a second voltage lower than the first voltage, wherein the first load point is connected to the second load bus-bar.

Preferably, the second transmission substation comprises a third load bus-bar having a third voltage and a fourth load bus-bar having a fourth voltage lower than the third voltage, wherein the second load point is connected to the fourth load bus-bar.

The first load point, reactive power absorber, MCSR can be also connected to first load bus-bar at the first transmission substation although it will be economically and technically less effective. Also, please note that second load point, reactive power generator, ACB can also be connected to the third load bus-bar at second transmission substation although it will be economically less effective.

Preferably, the first transmission substation is 220/132 Kilovolts (KV) and the second transmission substation is 132/33 KV, the second voltage of the second load bus-bar being 132 Kilovolts and the fourth voltage of the fourth load bus-bar being 33 KV.

Preferably, the first substation has first substation transformers and the second substation has second substation transformers, wherein the MCSR absorbs the excess reactive power generated naturally over feeders between the second load bus-bar and the third load bus-bar of the second transmission substation, and wherein the ACB generates the additional reactive power to flow in the fourth bus-bar in the direction of the second substation transformers and the distribution substation.

As a further aspect of the invention, there is provided an electric network comprising:
- a first substation comprising a first load bus-bar having a first voltage and a second load bus-bar having a second voltage lower than the first voltage;
- second substations in connection with the first substation, each one comprising a third load bus-bar having a third voltage equal to the second voltage and a fourth load bus-bar having a fourth voltage lower than the third voltage;
- a reactive power absorber connected to the second load bus-bar; and
- for each one of the second substations, a reactive power generator connected to the fourth bus-bar.

Preferably, a first station is a transmission station in connection with a power generator, and said second substations are transmission substations connected to distribution substations.

Preferably, the first station is connected to the power generator using extra high voltage transmission lines, wherein the first substation is connected to the second substations using high voltage transmission lines, and wherein the second substations are connected to the distribution substations using medium voltage distribution lines.

Preferably, the reactive power generator is connected to the fourth load bus-bar for generating additional reactive power between the second substations and the distribution substations.

Preferably, the reactive power absorber is connected to the second load bus-bar to absorb excess reactive power flowing in the direction of the power generator.

Preferably, the reactive power generator is an automatic capacitor bank (ACB) and the reactive power absorber is a magnetically controlled shunt reactor (MCSR).

Preferably, the first substation is 220/132 Kilovolts (KV) and the second substations are 132/33 KV, the second voltage of the second load bus-bar being 132 Kilovolts and the fourth voltage of the fourth load bus-bar being 33 KV.

Preferably, the transmission lines comprise over head lines (OHL) and underground (UG).

Preferably, the power generator comprises a generator station and a generator step-up transformer, the network further comprises a MCSR parallel to the step-up transformer for absorbing excess reactive power flowing through the transformer towards the power generator.

DETAILED DESCRIPTION OF THE INVENTION

Figure 1:
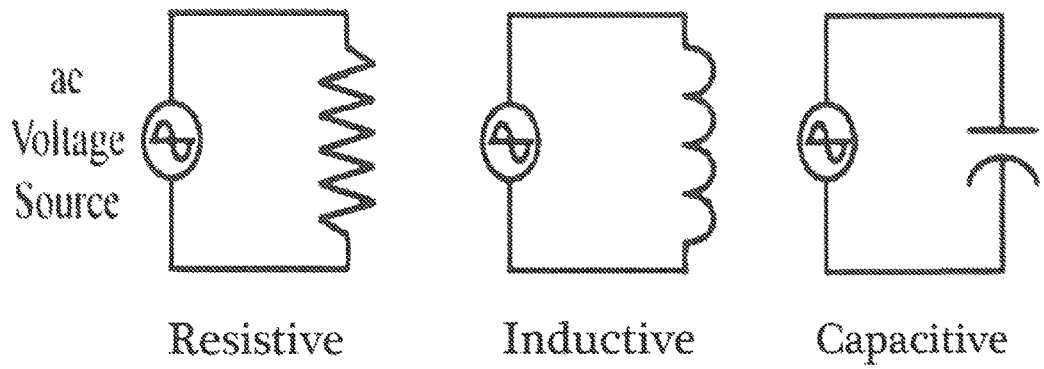
FIG. 1 illustrates the basic electric circuit elements.

The present technology is designed based among others on two things. First, is to choose best reactive power absorption and compensation elements to be used in the network. Second, is to choose the right locations to install these elements. The methodology of installation is to install the elements required to absorb excess reactive power and reduce the voltage to nominal voltage with large capacity on the high voltage side node (primary side) that has a higher number of feeders at the same time. It will absorb the excess reactive power generated on all these feeders and beyond. On other hand, install the elements required to generate reactive power and raise the voltage to the nominal with medium capacities on medium voltage side (secondary side) to compensate the shortage of reactive power directly to lower feeders demand side and substation local demand. By this way, the network will be relieved from reactive power flow and its associated reactive current that contributes to power losses.

The present technology allows saving energy by reducing the power losses in transmission network through effective control of reactive power (inductive & capacitive) by absorbing surplus and compensating shortage using automatic controlled reactive power components connected on effective locations in the transmission network on different voltage levels. Controlling reactive power will lead to relieve transmission network from reactive power and reduce its contribution to line current hence reducing the associated power losses, by this way above aim can be achieved.

The present technology allows among others for:
Reduction of power losses in transmission network and above that could reduce the amount of the total generation demand which lead to a reduction in the generation. Hence, equal to removing some generators from service.
Reducing the impact on the environment and climate change due to global warming caused by emission of green house gases. A reduction in carbon dioxide emission can be achieved through reducing power losses in electric network.
Operate the system at a unity overall power factor.
Relieving transmission network and generation from reactive power components, leading to full utilization of the generation and transmission network capacities for active power (MW), extra amount of transmission capacity relieve could be achieved.
Stabilize the high tension voltages at nominal values.
Improve the system stability, especially in case of any sudden interruption of large loads or main generator.
Reduce active power losses (MW) in the generation side and transmission network side which are being dissipated as heat in transformers and feeders hence, increasing the expected lifetime of network elements.
Improving the quality of electric energy parameters like voltage, current, power and power factor.
Making the above achievements in a cost effective way and a very efficient method.

The present technology can be applied in any utility network with some relevant modification. Hence, it can be considered as a reference approach for network power losses saving and voltage stabilization techniques.

Global Warming and Energy Saving

Global warming refers to the rising average temperature of Earth and its atmosphere. The Intergovernmental Panel on Climate Change (IPCC) in 2007 indicate that during the 21st century the global surface temperature is likely to rise a further 1.1 to 2.9° C. (2 to 5.2° F.) for their lowest emissions scenario and 2.4 to 6.4° C. (4.3 to 11.5° F.) for their highest. An increase in global temperature will cause sea levels to rise and will change the amount and pattern of precipitation, and a probable expansion of subtropical deserts. Scientists are more than 90% certain that most of them are caused by increasing concentrations of greenhouse gases produced by human activities such as deforestation and the burning of fossil fuels.

The present technology for saving energy by reducing power losses in electric system can help in reducing global warming through reduction of burning fossil fuel that releases greenhouse gases in the atmosphere. Reducing power losses in the transmission network can have higher impact on energy saving by reducing few percents from the total generated power of whole electric system.

The present technology can also improve other essential power system parameters that are very important to the reliability of power transfer like voltage stabilization, power system stability, power factor improvement and other power quality issues.

Electric transmission/distribution networks face challenges in voltage drops in some nodes, lack reactive power, overloading in some transmission feeders and inter-bus transformers and increasing power losses.

The present technology provides for a dynamic reactive power control system/method that it can maintain the system on overall unity power factor by generating the shortage of MVAR as well as absorbing the surplus of MVAR.

Automatic Capacitor Banks (ACB) can be used as reactive control generators and can be manufactured with the technical specifications (MVAR, KV, No. of stages) based on the needs of the project.

The second part of the proposed technology is related to reactive power absorption and over voltage reduction which can be achieved using magnetically controlled shunt reactors (MCSR) at high voltage level (e.g. 132 KV).

Importency of Reactive Power in Network and its Relation with Power Losses:

Insufficient reactive power in power grids results in a higher reactive components in the transmitted power and, consequently, a lower voltage and lower electrical system stability. An analysis of recent major failures has shown that the main reason was low usage rate of reactive power compensation devices in electrical power system. The reactive power generation does not require energy itself but its transmission over electrical grid requires extra cost to generate active power to cover losses. In addition, reactive power that transmitted from generator to consumers results in an extra load on the electrical grid elements and lowers their throughput. Therefore increased yield of reactive power by generators in order to deliver it to consumers is not feasible.

Source of Reactive Power in Transmission Network Elements

The main elements of transmission network generate or absorb reactive power like:
Transformers: they produce magnetic field and therefore absorb reactive power. The heavier the current loading the higher the absorption.
Underground cables: high voltage cables usually generate reactive power more than absorb it.
Overhead lines: A lightly loaded over head line is a net generator of reactive power whilst a heavily loaded line is a net absorber of reactive power.

Facts:
Flexible alternating current transmission system (FACTS) devices are used for the dynamic control of voltage, impedance and phase angle of high voltage AC lines. FACTS devices provide strategic benefits for improved transmission system management and operation efficiency through better utilization of existing transmission assets; increased transmission system reliability and availability; increased grid stability as well as increased quality of supply. Flexible ac transmission systems (FACTS) applications can be an alternative to enhance the steady-state security without constructing more transmission systems. A unique characteristic of FACTS is that they are effective in all three operation stages: normal, transient and post contingency.

There are three major types of FACTS which to be used as source of reactive power whether it is inductive or capacitive:
a. SVC, Static VAR Compensator: as per IEEE definition, SVC is a shunt-connected static VAR generator or absorber whose output is adjusted to exchange capacitive or inductive current so as to maintain or control specific parameters of the electrical power system (typically bus voltage).
b. STATCOM, Static Synchronous Compensator: As per IEEE definition, STATCOM is a static synchronous generator operated as a shunt-connected static VAR compensator whose capacitive or inductive output current can be controlled independent of ac system voltage.

c. SRP, Source of Reactive power: consists of controlled shunt reactor and series of capacitor banks connected in parallel. A controlled shunt reactor functions as a variable inductor (absorb reactive power) whereas capacitor banks can include several units (generate reactive power) to enable the step regulation.

SVC, STATCOM and SRP are major FACTS technologies that can be used as source of reactive power whether it is inductive or capacitive. SRP has an advantage over other FACTS devices due its simplicity, lower cost, and lower power losses of relative reactive power production and less footprint. The proposed technology is based on using of its absorber part (MCSR) on a node of HV side and its compensator part (ACB) on all relevant MV buses. The proposed technology will relieve transmission network form reactive power component leading to effectively reduction of associated active power losses.

Comparison of above FACTS Technologies:

Both SVC and STATCOM are efficient, has fast response but they are expensive, required step-up transformer, use large semiconductor thyristor rectifiers that need specialized operation and maintenance team. On the other hand, SRP can provide approximately similar performance with advantages of lower cost, lower losses of reactive power, less footprint, simple as power transformer, less harmonic distortion and higher acceptable over-voltage and overload factors. In spite of SRP shows higher advantages but it got less awareness in west countries perhaps due to the fact that the technology of the SRP has been initiated and developed in Russia and commonest countries whereas SVC and STATCOM has been initiated and developed in West countries, and both technologies come into comparison when they reach maturity stage.

In general, it can be said that, these FACTS technologies are efficient in achieving the main targets related to improve transmission system management and operation efficiency. It is also helpful in energy saving up to certain extent but it is not directly oriented toward energy saving because transmission network operators first priority is system reliability and availability to prevent any failure in the system and maintain power quality to end consumers, hence power losses considered as a part from transmission running cost.

The present technology uses a FACTS system that can provide advantages of transmission system reliability and transfer power parameters quality as well as high energy saving from reduction of transfer power losses. A new approach/design is proposed to provide these advantages with lower investment and higher performance efficiency.

Effective Design of FACTS for Energy Saving:

One of the achievements of the proposed technology is to have more efficient reactive power control within transmission network that ensure its reliability with heavily reduction of transmission power losses in entire transmission network.

To achieve the best utilization of existing transmission systems, FACTS devices should be installed in such a place to minimize the system congestion as much as possible while have minimum installation cost and also satisfy the thermal limits of transmission lines and the bus voltage limit in the network.

The Core Concept

Figure 9:
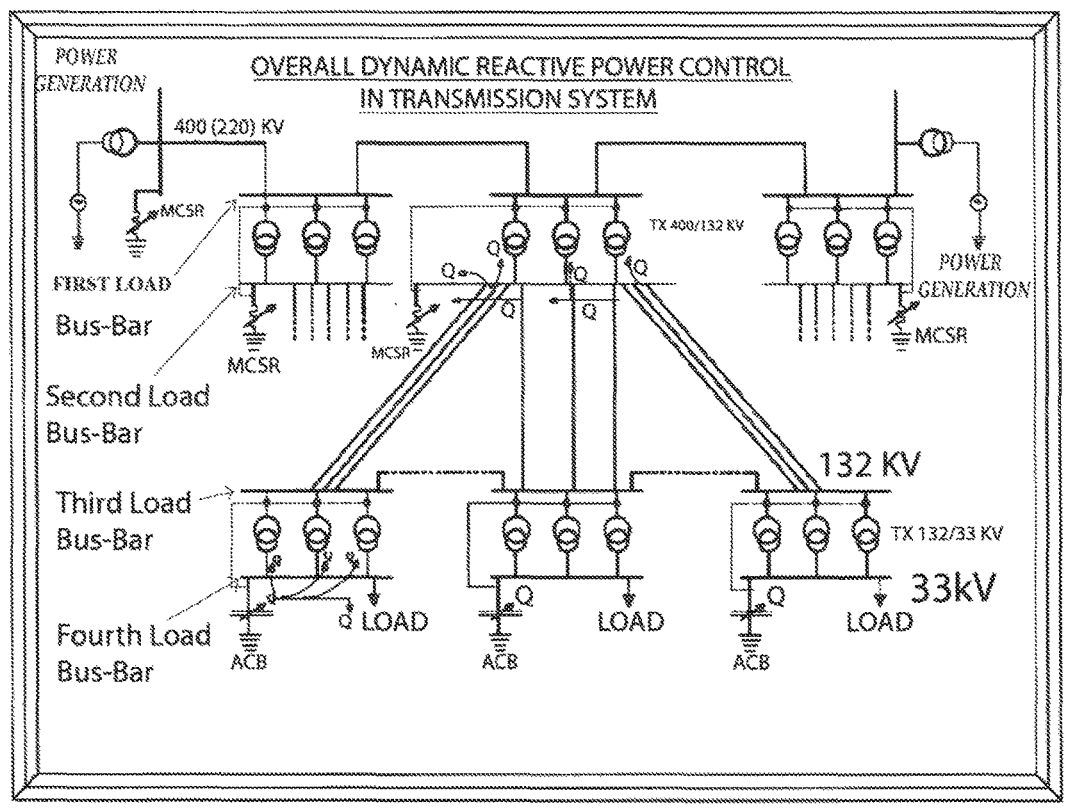
FIG. 9 illustrates an overall dynamic reactive power control in a transmission system in accordance with an embodiment of the present invention.

As illustrated in FIG. 9, the proposed concept/approach uses reactive power generation and reactive power absorption technologies to let them work into two different voltage levels of transmission network (high and medium voltage levels).

A simple transmission network consist of three major elements:

a. High voltage transmission feeders (overhead lines or underground cables), in order to transfer power from power plants to several transmission substations.
b. Transmission substations which have step-down transformers that reduce the voltage from high voltage to medium voltage levels.
c. Medium voltage feeders that transfer power from transmission substation to several distribution substations which in turn feed load substations.

In this case, a proper size of reactive power generator/compensator (automatic capacitor bank) will be connected per each transmission substation on the medium voltage bus to feed demand MVAR toward load substations. This will result in relieving the upper stream network that consists of step-down transformers, high voltage feeders and power plants from delivering reactive power hence, eliminating its associated power losses in generation side as well as whole transmission network.

On other hand, the absorber part (controlled inductor) will be connected only in higher voltage node of transmission, at the high voltage bus. This node has to be chosen based on the higher number of transmission feeders connected with. This absorber will absorb the surplus of reactive power generated naturally within these transmission feeders, especially in low demand period. Only it will ignore the reactive power that are going to be consumed in step-down transformers or in loads that not covered by capacitor banks.

In case that transmission network is too large and divided into several Islands, then the proposed technology can be applied per each island. As demonstrated above, there is no direct relation or coordination between the two parts (absorption part and generation/compensation part) of the proposed system. Both parts are independent but they are functioning in integration as a whole transmission system. The compensation part will take care about lower stream electric network reactive power demand and demand of inter-bus transformers at the same substation (medium voltage). The absorber part will take care of the upper stream electric system reactive power surplus (high voltage). The proposed technology will result a higher transmission power loss reduction.

Example of Application:

Assume an electric transmission network with energy imported from power plants and grid via 220 KV and 132 KV transmission lines. The city internal transmission network is 132 KV and stepped down to 33 KV through 13 transmission substations that are connected together by 132 KV feeders network. The connection of the absorber can be connected to the 132 KV bus on node that has the maximum number of 132 KV feeders. The connection of compensator part can be in all transmission substations at the 33 KV bus.

Description of Elements of the Proposed Technology:

As mentioned above, the proposed technology comprises two parts:

1. Absorber:
    A magnetically controlled shunt reactor (MCSR) can act as the absorber. It is a three-phase static device operating on the principle of continuous regulation of inductive reactance. It has a very fast response (less than one second to full loading) and can act based on received information of power factor and excess of reactive power in high voltage side though connected power sensors.
2. Compensator:
    Automatic capacitor bank ACB, will act as the compensator. ACB includes several parallel stages consist of series capacitors with detuned reactor. The Switching of each stage controlled is by circuit breaker that receives switching instruction from control relay in the control panel. The decision to add or remove stage is based on pre-set power factor and measured shortage of reactive power in related load demand.

Source of Power Losses and Achievable Energy Saving in Transmission Network:

The source of power loss in transmission network can be summarized in:
a. Power losses in transmission lines: mainly due to increasing of load current.
b. Power losses in transformers: due to increasing of load current and dropping of power factor less than unity.

The corrective actions of energy saving that can be taken are: reducing load current and improving power factor, both by compensating reactive power toward load demand side and local substation demand by using appropriate ACB at the lower voltage side (e.g. 33 KV level if the substation is 132 KV/33 KV).

Methodology

Introduction

Transmission network is used to transfer large amount of power from the sites where it is generated to the points where it is distributed. It has to be done as efficiently as possible to reduce power losses and improve electrical parameter. From economical point of view, power loss means loss of income. Additional investment over the initial investment of transmission lines has to be secured to improve the efficiency through an effective technology or solution that helps to increase the efficiency. Thus it's logical and economical to spend money to obtain as much efficiency as possible in transmission networks.

One of the achievements of the proposed technology is to have reduced power loss in transmission sector which results in less fuel consumption and thus less $CO_2$ emission.

Simulation Study

Simulation study will be used to determine the effects of ACBs' on the electrical parameters and saved power losses at the following:
a) 132/33 KV transmission substation, when ACB installed on the 33 KV bus-bar.
b) 220 KV and 132 KV overall transmission network, when ACB installed gradually—phase by phase—on the 33kv side of transmission substations 132/33 KV.

Source of Power Losses in a Transmission System

Transmission network can be divided into two major parts, where power is lost:
1—Transmission lines (Over Head lines and Under Ground cables)
2—Transformers (Step-up and Step down transformers)

In this example of transmission network:
Transformers are 300 MVA 220/132 KV and 75 MVA 132/33 KV.
Transmission lines are 220 KV OHL and 132 KV OHL & UGC.

Although, the sources of power losses are the same for both transmission and distribution networks, however the distances and load are greater in transmission networks and thus the efficiency must be higher. In a transmission network, transmission lines have more power losses sources compared with transformers.

Basic Circuit Element

As illustrated in FIG. 1, a transmission network has all the basic electric circuit elements. A brief description of causes of power losses sources in transmission network is discussed below:

Resistance: The series resistance of a conductor depends on the resistivity of the conductor material, its length, temperature and the skin effect. The DC resistance ($R_{dc}$) is directly proportional to the resistivity ($\rho$) and length (l) and inversely proportional to the cross-sectional area (A) and given by $$R = \frac{\rho l}{A}.$$

Resistance causes active power loss (W) dissipation and results voltage drop along the line and inside transformers, $Ploss = I^2 R$.

Reactance: (inductance) the magnetic flux produced by the ac current produces series inductive reactance ($X_l$) because of both self inductance (which cause skin effect) along a conductor and mutual inductance between conductor and other conductors close by. Reactance causes reactive power loss (VAR) from $Qloss = I^2 Xl$ and phase shift between voltage and current. The reactive power demand of transmission network must be supplied by the generator in addition to load power.

Capacitance: Any conductors separated by a distance have capacitance. The capacitance of a transmission lines depends on the conductor size, spacing, height above the ground and voltage. Capacitance generates reactive power (VAR) to the grid and is based on the applied voltage.

$$Qc = \frac{V^2}{Xc}.$$

When Capacitive reactive power is greater than load, it has to be absorbed by first the reactance (inductance) of transmission lines, and finally by the generator.

Corona: It is caused by the breakdown of the air around a transmission line because of high voltage. The effect is more severe around small conductor and sharp points and corners. Corona absorbs energy from the line.

Figure 2:
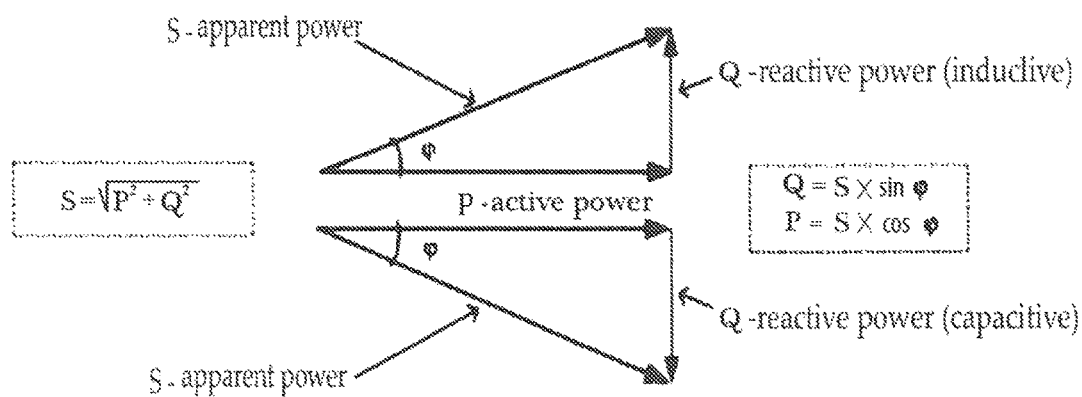
FIG. 2 illustrates the power triangle relationship between active power loss (MW), reactive power loss (MVAR) and apparent power loss (MVA)

The proposed technology would reduce active power loss (MW), reactive power loss (MVAR) and apparent power loss (MVA) which are produced from combination of active and reactive power losses as per the relation illustrated by the power triangle illustrated in FIG. 2.

Power Losses in Transmission Lines

Figure 3:
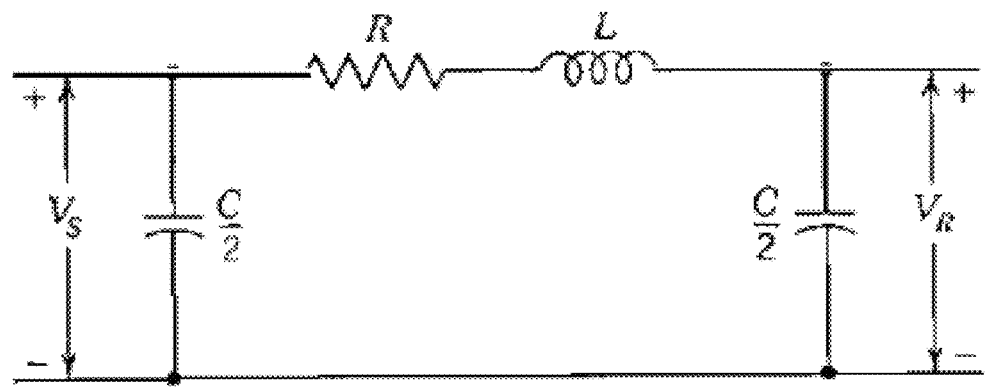
FIG. 3 illustrates a nominal $\pi$ circuit of medium length transmission lines.

Transmission lines are composed of over head lines and underground cables. To study power losses in transmission lines, an equivalent circuit of medium length transmission line presented in nominal π circuit is shown in FIG. 3.

Transmission line equivalent circuit diagram is presented in order to simplify understanding of sources of power losses lost though out it. From FIG. 3, it can be realized that:
Active power will be lost in the series resistance R.
Reactive power will be lost in series inductance L.
Reactive power will be generated from shunt capacitance C.

Power Loss in Transmission Lines due to System Loading

Loading of a system can be represented by loading current or line current $I_l$, since voltage must be maintained constant, with permitted variation (+/−5%). The impact on power losses lost in transmission lines due to the change in loads and loading current is as follows:
Active power loss (MW) lost in resistance of the line is directly proportional to square of value of line current $I_L$, recall $P_{loss} = I^2 R$.

Reactive power loss (MVAR) lost in inductance of the line is directly proportional to square of value of line current $I_L$, recall $Q_{loss}=I^2Xl$.

Reactive power (MVAR) generated (gained) from capacitance of the line is directly proportional to square of value of line voltage and should stay the same over different loading condition with small variation due small variation in the voltage. Recall $(Qc=V^2/Xc)$.

The overall power losses are active power loss (MW) in line resistance and net summation of reactive power (MVAR) generated by line capacitance and lost in line inductance.

Measuring and Calculating Power Losses

Transmission line power losses are the losses between sending and receiving ends. They can be obtained by subtracting the receiving end values from sending end values for all type of power losses as stated below:

Apparent Power Loss (MVA): $\Delta S=S_s-S_r$

Active Power Loss (MW): $\Delta P=P_s-P_r$

Reactive Power Loss (MVAR): $\Delta Q=Q_s-Q_r$

Each transmission line power loss has to be determined individually and the overall transmission lines power losses will be the summation of every transmission line power losses.

Figure 4:
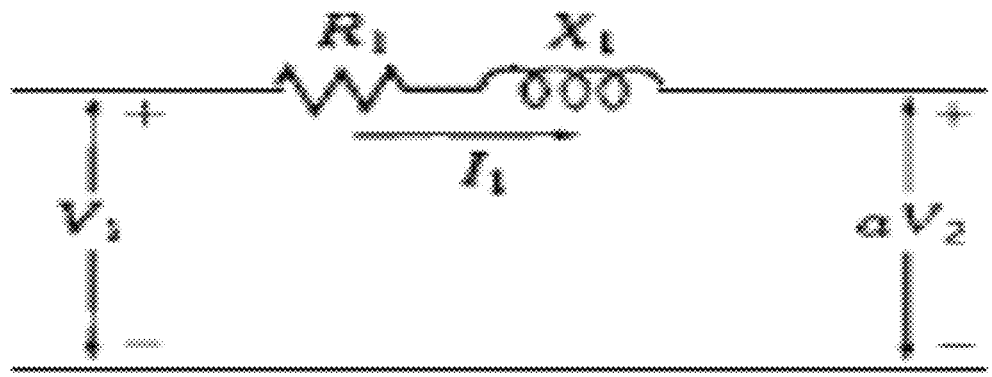
FIG. 4 illustrates a transformer equivalent circuit with magnetizing current neglected.

Power Losses in Transformers:

To study power losses in transformers, an equivalent circuit of transformer presented in FIG. 4. Transformer equivalent circuit diagram is presented in order to simplify understanding of the source of power losses lost within it. From diagram it can be realized that:

Active power will be lost in the series resistance R.
Reactive power will be lost in series inductance L.
No reactive power will be generated in transformer (neglected).

Power Loss in Transformers due to System Loading

Figure 5:
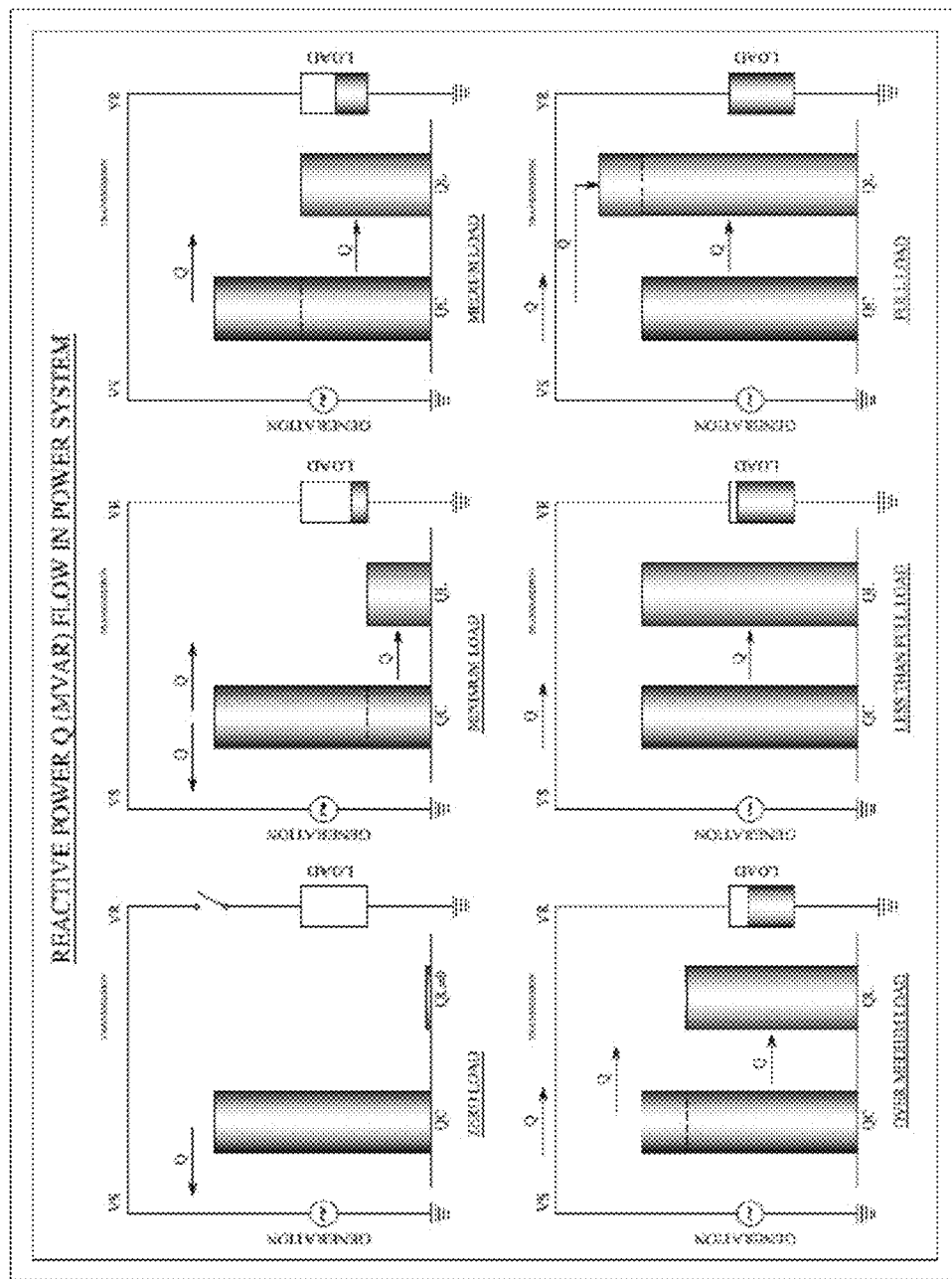
FIG. 5 illustrates the reactive power generated and consumed by transmission lines capacitance and inductance respectively at different loading conditions.

FIG. 5 is about reactive power generation and consumption in transmission lines due to the change of loading current. The impact of power losses lost in transformer due to the change in loading current is as follows:

Active power loss (MW) lost in resistance of transformer is directly proportional to square of value of line current $I_l$, recall $P_{loss}=I^2R$.

Reactive power loss (MVAR) lost in inductance of transformer is directly proportional to square of value of line current $I_l$, recall $Q_{loss}=I^2Xl$.

No reactive power (MVAR) is generated in transformer (capacitance neglected).

Measurement and Calculation of Power Losses

Transformer power losses are the losses between its primary and secondary terminals. They can be obtained by subtracting the secondary terminal values from primary terminal values for all type of power losses as stated below:

Apparent Power (MVA): $\Delta S=S_P-S_S$

Active Power (MW): $\Delta P=P_P-P_S$

Reactive Power (MVAR): $\Delta Q=Q_P-Q_S$

Each transformer power losses have to be determined individually and overall transformers power losses in transmission network will be the summation of every transformer.

How to Reduce Transmission Lines Power Losses

To simply the idea of the concept that will be used in power saving in transmission network, let us assume a transmission line with a series impedance of $Z=R+jX$, to transfer power from generating side to load side.

Current (I) will flow from generation through transmission line impedance toward load.

Power losses in transmission network can be determined as follow:

Active Power Loss $P_{loss}=|I|^2*R$

Reactive Power Loss $Q_{loss}=|I|^2*X$

Apparent Power Loss $S_{loss}=\sqrt{(P^2+Q^2)}=|I|^2*Z$

Therefore, logical thinking from above equations, to reduce apparent power loss either active, reactive power losses or both have to be reduced. To reduce active and reactive power losses, there are two options:

Option 1: is to reduce resistance R and reactance X of transmission network. This means to add more parallel transmission feeders and parallel transformers. This requires very high investment and involves risk of increasing fault level.

Option 2: is to reduce current I. This option would be more efficient since active and reactive power losses are proportional to the square value of current I. This means any slight reduction in current will result higher reduction in power losses.

How to Reduce Current I

Since apparent Power Loss $S_{loss}=\sqrt{(P^2+Q^2)}=|I|^2*Z$

Then $|I|^2=\sqrt{(P^2+Q^2)}/Z$

And $I=Ir+jIx$ $|I|=\sqrt{(Ir^2+Ix^2)}$

Eliminating the flow of reactive power Q and its reactive current Ix throughout transmission network will reduce the overall line current I in the transmission network which will lead to lower active and reactive power losses in transmission network, thus apparent power loss ($S_{loss}$) will reduce.

This can be achieved by:

Enabling balance reactive power generation and absorption inside transmission lines.

Installing ACBs' (reactive power generator) at secondary side of inter-bus transformers.

MCSRs' on 220/132 KV main transmission substation at 132 KV side to absorb any surplus reactive power produces in transmission lines and flowing toward generation. By this method, no flow of reactive power between any two nodes should exist in transmission network as well as its associated reactive current.

Derived Expressions

They are to help to extract more information from measured values. The derived expressions are as follows:

Power loss saving percentage due to improvement of power factor from $pf_1$ to $pf_2$ is determined by formula:

Saving % from $P_{loss}=(1-(pf_1^2/pf_2^2))*100$

When $pf_2=1$

Then, Saving % from $P_{loss}=(1-pf_1^2)*100$

Figure 6:
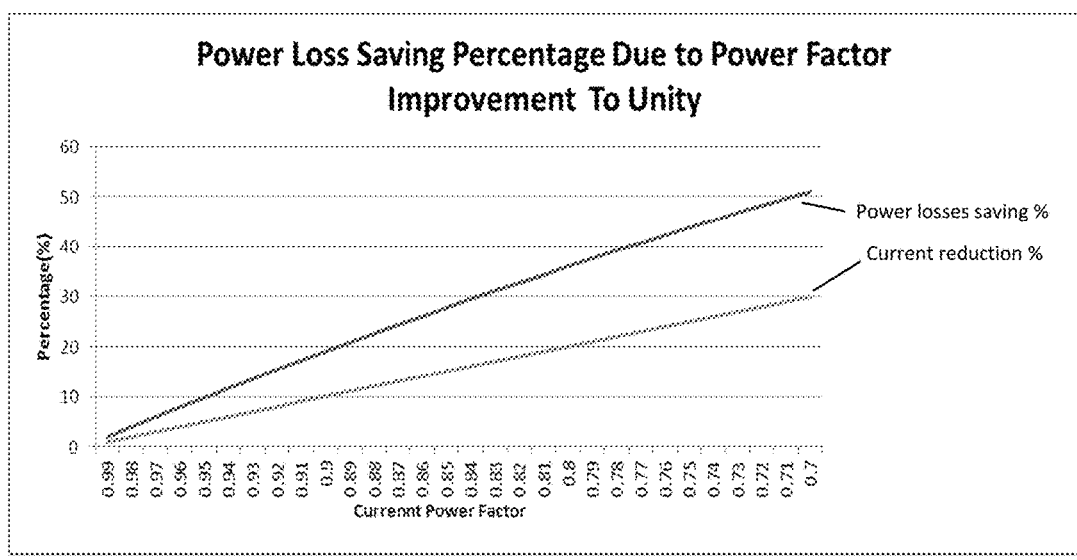
FIG. 6 illustrates Power loss saving percentage due to power factor improvement to unity.

Reduction of load current due to improvement of power factor from $pf_1$ to $pf_2$ $I_2=I_1(1-(pf_1/pf_2))$ and $I_2=I_1(1-pf_1)$ when $pf_2=1$ Current reduction percentage %=$(1-(pf_1/pf_2))*100$ If $pf_2=1$, then current reduction percentage=$(1-pf_1)*100$ As illustrated in FIG. 6, generally, it can be said that current decreases with the same percentage of power factor improvement, inverse proportional relationship.

Example and Simulation

Effective Reactive Power Control

The sources of power losses in transmission network and the proposed reduction solutions have been explained above. This section is applied to the example presented above with a transmission network comprising first substations at 220/132 KV and second substations at 132/33 KV. The approach, to effectively reduce power losses, is mainly by reducing magnitude of line current (Amps) and thus reduction of power losses. Active power (MW) flow from generator through transmission circuits up to load. Reactive power is proposed to be generated at the edge between transmission and distribution network which is at 33 KV side in the case of 132/33 KV transmission substation.

By installing Automatic detuned Capacitor Bank (ACB) to the 33 KV busbar to feed the required reactive power (MVAR) demand of both inter-bus transformers and downward distribution network will help to reduce or eliminate the flow of reactive power in above transmission network enabling only active power to flow leading to lesser power losses.

In the minimum load context, the expected reactive power generated through the transmission lines, due to their capacitance, will flow toward generators side. To avoid this phenomena, Magnetically Controlled Shunt Reactor (MCSR), are introduced at 132 KV side of 220/132 KV main transmission substation. MCSR will absorb any reactive power flowing toward generators at this node. In this case, no reactive power or reactive current will flow in transmission network in both directions of Generation and Distribution. A possible structure of applied solution will be as follows:

Installation of ACBs at 33 kV bus-bar side of all 132/33 KV substations.

Installation of MCSRs at 132 kV bus-bar side of 220/132 KV substations.

Proposed Components

The proposed components of the technology are:

Automatic detuned Capacitor Bank (ACB): 56 MVAR, 33 KV, 7 stages (8 MVAR), step response detuned capacitor bank to generate reactive power and improve dropped voltages.

Magnetically Controlled Shunt Reactor (MCSR): 70-100 MVAR, 132 KV, fast response variable reactor to absorb reactive power and reduce over voltages.

ACB at 132/33 KV Substation 1

Figure 7:
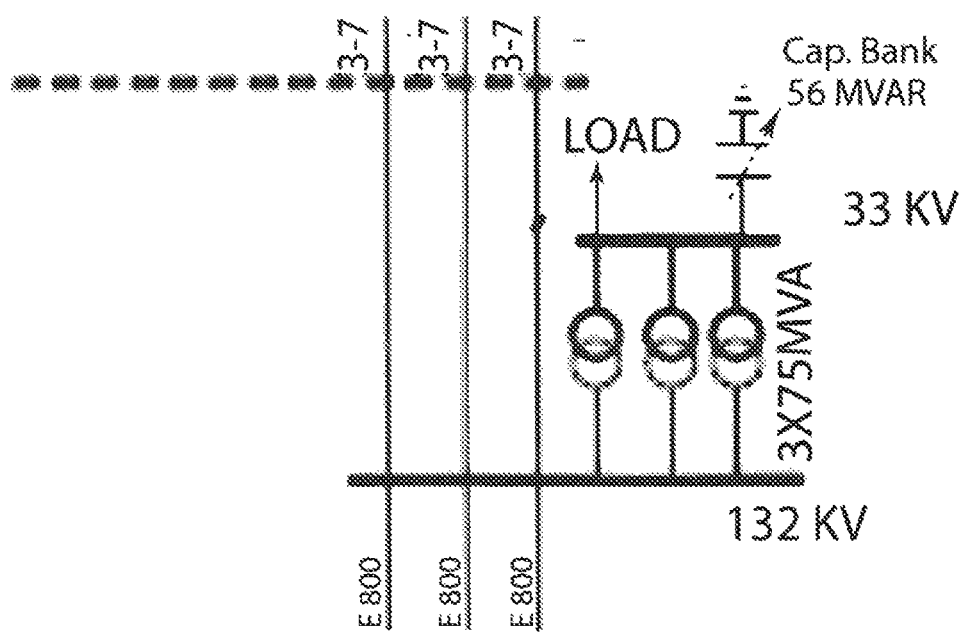
FIG. 7 illustrates an ACB at substation 1 at 132/33 KV.
Figure 8:
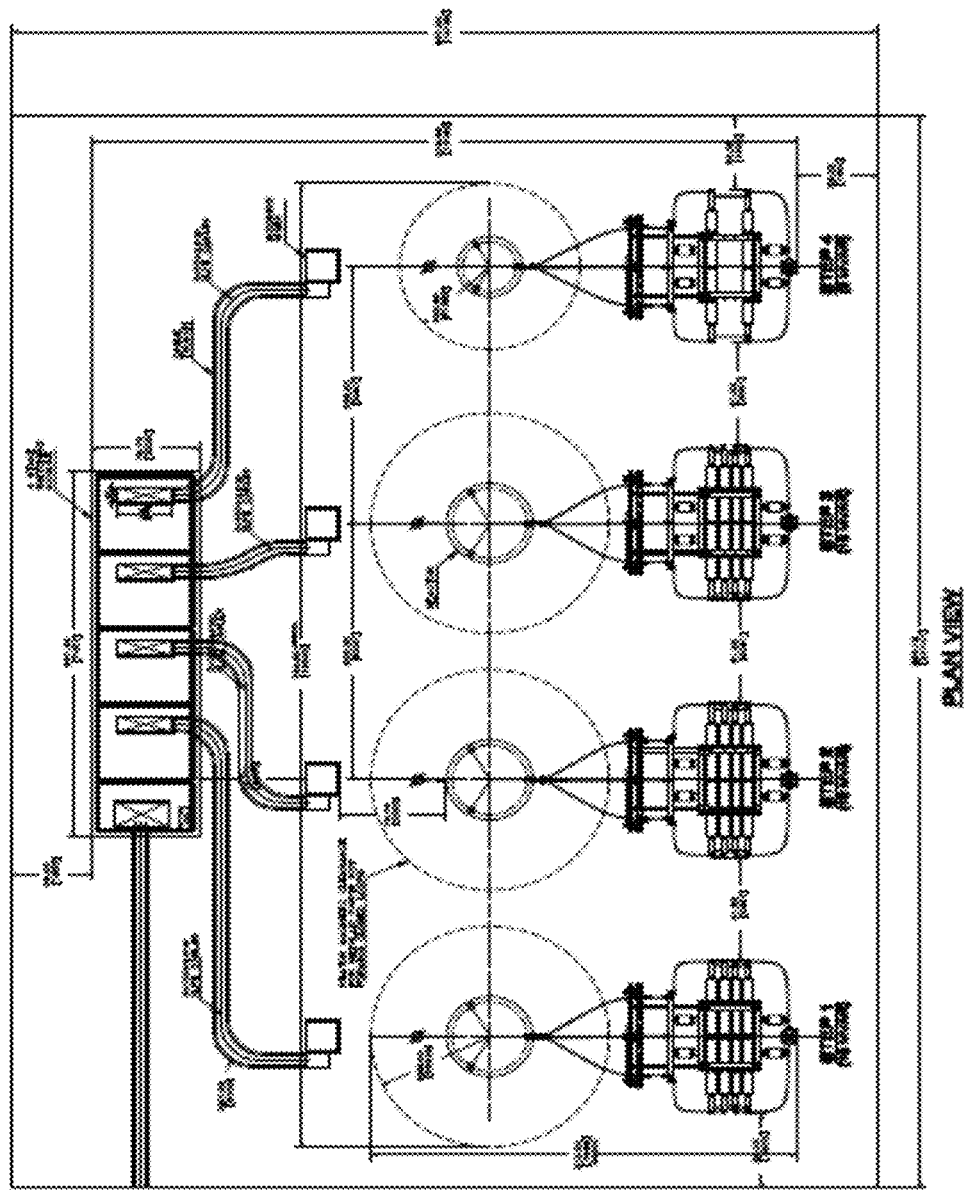
FIG. 8 illustrates a plan view of the ACB with associated detuning Reactors.

As illustrated in FIG. 7, a 132/33 KV substation within the transmission network according to our example can be observed. Substation 1 is fed by 6 number of 132 KV feeders and connected with 3×75 MVA 132/33 KV inter-bus Transformers. Load is connected to 33 KV side. ACB, automatic detuned capacitor bank has been installed on 33 KV bus-bar side, parallel to load. ACB will receive information about imported power parameters from sensors CT's and VT's at 132 KV (primary) side of the three Inter Bus Transformers (IBT). This information will help ACB control relay (at control panel) to know the imported reactive power and the power factor at that time. Control relay then will instruct addition or removal of required capacitor stage, so as to compensate the required shortage of reactive power in transmission substation and its load, thus to limit the imported reactive power from transmission network within the pre-set value. Note that ACB has step response which means that after a certain delay time, (say 10 minutes) new instruction will be activated. FIG. 8 illustrates the plan view of ACB with associated Reactors.

Simulation of ACB Impact at 132/33 KV Substation 1:

It has been conducted by using simulation software CYME for two scenarios: (1) without installation of ACB; (2) With installation of ACB. The outcome results before and after the installation of ACB are presented from the below Table 1. Additional information has been obtained using derived expressions.

TABLE 1

| Electrical parameter | Unit | Before installation of ACB | After installation of ACB | Difference | Improvement percentage |
|---|---|---|---|---|---|
| Line voltage | Kilo Volt | 132 | 132 | 0 | 0% |
| Phase current | Ampere | 245.5 | 213.8 | −31.7 | −12.9% |
| Active power | MW | 48.03 | 47.98 | 0.05 | −0.104% |
| Reactive power | MVAR | 29.06 | 9.37 | −19.69 | −67.76% |
| Power factor | Ratio | 0.856 | 0.9814 | 0.1255 | 14.66% |
| Apparent power | MVA | 56.14 | 48.89 | 7.25 | 12.9% |

This table 1 illustrates the simulation results before and after installation of ACB per single transformer. Overall, it is evidence that ACB has great impact in improving electrical parameters at transmission substation. In detail, ACB significantly reduced the imported reactive power that dropped to just under one third of demand. Similarly, load current declined to 12.9%. In contrast, power factor has improved from 0.856 to 0.9814 to make up 15% increase. The relieve in transformers capacity is as much as the reduction in load current. Moving on to active power loss saving, ACB resulted in a 0.05 MW saving per Transformer. Total power savings for three Transformers is equal to 0.15 MW, increasing the efficiency of IBT's.

Since there is a reduction in current by 12.9%, then the associated power losses reduction is 24.2% obtained using derived expression. In fact, 24.2% reduction in original power loss represents only 0.104% of total demand as seen in Table 1. Therefore, the original power losses percentage can be obtained by (100/24.2)*0.104%=0.43% from total demand. Total original active power loss=0.0043*48.03 MW*3 Tx=0.619 MW.

Improvement before and after Installation of ACB (56 MVAR) at 33 KV Side of Transformer

TABLE 2

| Electrical parameter | Unit | Before installation of ACB | After installation of ACB | Difference | Improvement percentage |
|---|---|---|---|---|---|
| Secondary voltage | Kilo Volt | 31.16 | 32.447 | 1.287 | 4.13% |
| Secondary current | Ampere | — | — | — | — |
| Active power | MW | 47.85 | 47.85 | 0 | 0% |
| Reactive power | MVAR | 22.80 | 4.63 | −18.17 | −80% |

Table 2 illustrates the improvement gained after installation of an ACB. The significant impact is on the reduction of imported reactive power (MVAR) by 80% although the load demand of active power stayed the same. Another advantage was increase of voltage from 31.16 KV to 32.44 KV closer to nominal voltage 33 KV. This result represents 4.13% increase. Although current is not shown in the study, however it will be automatically reduced close but lower than current reduction percentage at primary side 132 KV.

Saving on Reactive Power Loss that is Consumed inside Winding of IBTs

Transformer reactive power loss before installation of ACB:

Primary $Q$(MVAR)−Secondary$Q$(MVAR)=29.06−22.8=6.26 MVAR

Transformer reactive power loss after installation of ACB:

Primary $Q$(MVAR)−Secondary $Q$(MVAR)=9.37−4.63=4.74 MVAR

Thus, reactive power loss saving=6.26−4.74=1.52 MVAR

Reactive power loss saving percentage=(1.52/6.26)*100=24.28%.

Total reactive power loss saving=3*1.52 MVAR=4.56 MVAr

Saving on the Capacity of the Transformer (MVA)

The rated power of a transformer is defined by the rated apparent power with a unit called MVA. The IBTs at substation 1 has a rated capacity of 75 MVA.

Used capacity before installation of ACB:

$S$(MVA)=$\sqrt{(MW^2+MVAR^2)}$=$\sqrt{((48.03)^2+(29.06)^2)}$=56.14MVA

Used capacity after installation of ACB:

$S$(MVA)=$\sqrt{(MW^2+MVAR^2)}$=$\sqrt{((47.98)^2+(9.37)^2)}$=48.89 MVA

Thus, apparent power $S$ saving=56.14−48.89=7.25 MVA

Total Apparent power capacity saving=3*7.25 MVA=21.75 MVA

Apparent power saving percentage=(7.25/56.14)*100=12.9%.

Approx. 13% relieve in the used capacity of the transformer

Installation of 56 MVAR ACB helped according to this experiment to reduce active, reactive and apparent power losses by 24.2%. The overall power losses saving percentage is illustrated in Table 3 below.

TABLE 3

| Electrical parameter | Unit | Total power loss (before) | Total power loss (after) | Difference | Power losses saving % |
|---|---|---|---|---|---|
| Active power | MW | 0.54 | 0.39 | 0.15 | 27.7% |
| Reactive power | MVAR | 18.75 | 14.22 | 4.56 | 24.3% |
| Apparent power | MVA | 18.75 | 14.225 | 4.52 | 24.2% |
| Active power loss percentage | % | 0.43% | 0.326% | 0.104% | 24.2% |

Impact of Application of ACBs in Transmission Network

Simulation of Impact of ACB on an Entire Transmission System

A simulation has been conducted on an entire transmission network. The ACB was distributed on all transmission substations network at 33 KV buses based. The simulation was done using Siemens, Power System Simulator software (PSSE) with fixed load demand 1900 MW and 635 MVAR. The output results from simulation study process are as detailed below.

Critical Analysis of Simulation Results:

The simulation showed change in generated power and transmission power losses due the increase of installation of shunt capacitor which is ACBs at 33 KV side. While the installed capacity of shunt capacitor is increasing (at constant load), the generated active and reactive powers are decreasing, the active power loss of transmission network is decreasing, the reactive power loss of transmission network is decreasing, the reactive power consumed by transmission network is decreasing, and the reactive power generated by transmission lines is increasing.

To understand above phenomena lets recall that transmission network's basic circuit elements such as resistance, inductance and capacitance. What happened is that a reactive power compensation to load demand at top of distribution voltage level, 33 KV, as well as compensation for major source of reactive power demand in transmission network, the 132/33 KV inter-bus transformers at their secondary terminal 33 KV, help to eliminate the flow of their reactive power demand amount from generation throughout transmission up to distribution and hence reduce the associated reactive current leading to reduce the magnitude of current coming from generation throughout transmission network.

The reduction of line current is the key solution of these phenomena. Recall that active power loss in resistance and reactive power loss in inductance are directly proportional to square value of current passing through them. Reduction of current value leads to decrease in active power loss and voltage drop in resistance and decrease in reactive power loss consumed by inductance of transmission network. Parallel to that, the reduction in voltage drop will improve, increase, the sending end voltage and since capacitance of the line generates reactive power directly proportional to square value of applied voltage to its terminals, transmission network would be able to generate more reactive power.

This will give an answer for why there is the gap between reactive power generation and consumption inside transmission network is shrinking when the shunt capacitor is increasing. And this is a means to make transmission lines self sufficient of reactive power demand at system peaks.

Overall, it is evident that proposed solution will help to effectively reduce all kinds of power losses and improve other electrical parameters in transmission network.

Transmission Network Simulation for Power Losses Saving

All kinds of power losses active, reactive and apparent have been reduced. The achieved power losses saving percentages are 18.5% for active power loss saving and 57.7% for reactive power loss saving. As long as installation of shunt capacitors is increasing, the power losses saving are increasing. This is valid till the flow of reactive power reaches zero or in other word power factor equal unity. If extra compensation is applied, a reactive current will flow in opposite direction to be consumed by generators and the overall magnitude of current in transmission network will be greater. Anyway, still there is 122 MVAR is available for additional compensation.

Second logical and technical reason of this conclusion is that the reduction of current that caused reduction of power losses at scale of transmission substation will also exist in transmission lines in case of ACB installed in all substations and it will reduce active power loss with the same percentages. Therefore, 0.3 or 30% will be the factor to be used to produce the actual power losses saving out from total power losses of transmission lines.

Power Losses in Transmission Lines

The second major component of transmission network is transmission lines which is compose of Over Head Lines (OHL) and Under Ground (UG) cable. As it explained in methodology, power losses in transmission lines will be obtained by subtracting receiving end values from sending end values and added together to obtain overall power losses.

Active power loss (MW) percentage in transmission lines at peak from simulation results at (1900 MW):

Apparent power loss: $\Delta S = Ss - Sr = 71.8$ (MVA)

Active power loss: $\Delta P = Ps - Pr = 22.1$ (MW)

Reactive power loss: $\Delta Q = Qs - Qr = 68.3$ (MVAR)

P loss %=(22.1/1900)*100=1.16%

Transmission feeders efficiency=98.84%

Active Power Loss (MW) Percentage in Transmission Lines from Real Measurement at Peak (Measured Values Used are for Fuel Saving Calculation):

P loss %=(153/2000)*100=7.65%

Transmission feeders efficiency=92.35%

Note that active power loss (MW) is the most important with regard to fuel consumption and carbon dioxide emission reduction. Active power is the power that converts to work in electrical machines There will be an attempt to assess the active power loss and the saved active power loss obtained by applying this solution. The measured values are the ones which will be used.

Total Active Power Loss Percentage in Transmission Network $$\text{Total power losses in transmission network} = P \text{ loss \%}$$
$$= P \text{ loss feeders} +$$
$$P \text{ loss transformers}$$
$$= 7.65\% + 2.943\%$$
$$= 10.59\%$$

Since, measured overall power losses saving %=30%, assuming that the same power losses saving % in transformers (30%), due to current reduction, can also be applied on transmission feeders based on the fact that the same current reduction will exist in transmission feeders. Then, overall power loss saving percentage in transmission network=P loss saving %=(30/100)*10.59%=3.178%

Consider 3% of total continuous active power generation over the year will be saved using proposed solution. So, there should be 3% reduction in fuel consumption since fuel is used to produce active power that converts to work at load places.

Impact on Power Losses Reduction in Generation and Distribution Network

Obviously, there will be positive impact and reduction of power losses in both networks although solution is installed on transmission network.

At Distribution Network

The source of power losses reduction in distribution network will come from current reduction in 33 KV feeders. According to this example, there is an improvement from 4-5% in voltage of 33 KV side of inter-bus transformer. This improvement is subjected to all 33 KV feeders. Currents on all these feeders will reduce by the same percentage, or little bit greater due to additional power losses saving. This reduction in current will result reduction on all power loss types due to the phenomena described earlier in this chapter. The expected active power loss reduction percentage due to 4-5% reduction in current will be around 10% of active power loss.

At Generation Side

Since current starts flowing from generator stator to generator step-up transformer then to transmission network, it can be considered that the reduction on current provided by application of proposed solution will have the same impact on generation side as well as transmission. For example, the impact of current reduction on inter-bus transformer at transmission network could be the same on generator transformer and generator stator (same power losses reduction percentage) in case they share the same current reduction percentage.

Overall Reduction Percentage

It can be assumed that overall impact of application of proposed solution at transmission network on active power loss reduction on whole power system will range from 4% to 5% reduction of total active power (MW) demand that will reflect a reduction with the same percentage in fuel consumption and carbon dioxide emission reduction.

Fuel Consumption and CO2 Emission

Saved Electrical Energy

The reduction percentage on total power demand due to implementation of the proposed solution and power loss reduction will have a direct impact on the amount of mass of fuel and associated CO2 emission to be saved due to reduction of total demand. The calculated and expected percentage of fuel and CO2 emission reduction is from 3% to 5%.

Additional Practical Benefits

1—It will help to reduce power losses that create heat dissipation and increase electric component temperature. A lower operation temperature will help to extend the life expectancy of the power system components.

2—Lower loading of power system components will help to reduce the maintenance requirements and spare parts.

Monitoring System/Method

It is important to monitor and record the instantaneous values of power system components parameters in order to measure and analyze their performance, power parameters quality and stability conditions. Monitoring system comprises these elements:

Power System Monitoring Recorder:

Power system monitoring recorders are proposed to be installed at all switchgears in the entire transmission system substations. They can record the instantaneous values (wave form) of input current and voltage, with high sampling rate per cycle. Based on these two major inputs, all other power parameters quantities at that switchgear/breaker like apparent power, active power, reactive power, power factor, phase angle, harmonics . . . etc can be computed and recorded by the power system monitoring recorders.

Features that can be provided by the power system monitoring recorder are Digital Fault Recorder (DFR), Dynamic Swing Recorder (DSR), Sequence of Event Recorder (SER), Power Quality Recorder (PQR), Long Term Trend Recorder (LTR), Continuous Disturbance Recorder (CDR) and Real Time Monitoring (RTM). Power system recorder creates records simultaneously in three time domain fault (fast), dynamic swing (slow) and trend records and also creates event logs.

Wide Area Monitoring:

The integrated Phasor Measurement Unit (PMU) functionality streams synchrophasor data for wide area monitoring. Voltage stability is monitored with real time phasor magnitude and phase angle supervision. The Continuous Disturbance Recorder (CDR) create continuous records with faults, swing and trend records provide wide area visibility of system performance. The CDR also creates redundancy in PMU data storage and it can help to understand long term power system behavior.

Record Base Central Station:

Record base central station software Provides automated collection, storage and network access to transient fault and dynamic swing records produced by power system recorders. Its features comprise integrated record database, graphical interactive record display, record summaries, status reporting and self-monitoring. It provides company-wide access to data through the LAN.

System Monitoring and Control at LDC, Load Dispatch Center:

The record base central station hardware and software is proposed to be installed at LDC, Load Dispatch Center of a power utility. Record base central station has the communication means with all power system monitoring recorders, therefore it can collect, record, store, analyze, compare and report all information about electric network performance. Considering that the Automatic detuned Capacitor Banks (ACB) and Magnetically Controlled Shunt Reactors (MCSR), which are the main components for Transmission System Overall Dynamic Reactive Power Control, are also monitored and remotely controlled by LDC.

For the purpose of transmission system power losses measurement, Record base central station can collect all instantaneous power values at all nodes in transmission network like sending and receiving ends of electric feeders and primary and secondary terminals of transformers and input these power values in mathematical process (subtraction then summation of results) to obtain the current power losses in respective power system dissipated within each power system component (feeder or transformer). The accumulated power losses values over certain period of time can be determined and compared before and after installing proposed power saving solution to determine the effectiveness of the proposed solution.

Also, voltage stability can be observed and maintained by monitoring the system voltages on different buses. Via Power system monitoring recorders, Record base central station can collect all instantaneous voltage values at all nodes in transmission network to insure acceptable voltage levels and voltage stability conditions. A subsequent operation decisions can be made to adjust and tune input parameter values of ACB's and MCSR's to reach a lower possible power losses and higher voltage stability operation conditions while monitoring that improvement directly at LDC screen via power system monitoring recorders and record base central station software. Based on system simulation and operation experience, a seasonal setting scheme can be prepared for "Transmission System Overall Dynamic Reactive Power Control" components parameters to achieve optimum power system performance over the year.

In conclusion, power system monitoring recorders and record base central station can monitor the impact of the proposed solution in terms of power losses reduction, maintaining high voltage stability and power parameters quality. In the same time LDC operators can monitor that and remotely optimize and tune ACB and MCSR parameters to achieve minimum power losses at maximum voltage stability and power transfer capability.

Example of MCSR: Controllable Shunt Reactor RTU-100000/132

As an example of MCSR that can be used in the system, the RTU-100000/132 having the following technical specifications.

The controlled by magnetic basing shunt reactor RTU-100000/132 is a complex of electro technical equipment that consist of the following main parts: (1) electromagnetic part of the reactor; (2) two converter units—main and stand-by; (3) automatic control system, located inside the premises of the substation control board; (4) direct current and voltage transducers.

The principle of controlled shunt reactor is based on the changing of the inductive reactance of the reactor's network winding by means of changing the degree of saturation of its magnetic system by direct magnetic current created by control winding of the reactor while passing through it the current rectified with the help of semiconductor converters. The higher is saturation degree of the reactor's magnetic system the lower is its inductive reactance and higher is its consumable reactive power.

Changing of the inductive reactance of the reactor is performed in accordance with designated operating mode and signals from the equipment of reactor and substation. Reactor is intended for operation in one of the below mentioned modes: automatic voltage stabilization in load point of the reactor; automatic current stabilization of the reactor's network winding; manual regulation of the reactor's network winding current.

Voltage stabilization in load point of the reactor is performed by means of changing the current of its control winding according to the given voltage data and current data of the line voltage obtained from the voltage measuring transformer. Degree of reactor's influence on the supply-line voltage is defined like ratio of the nominal current of its power winding and three phase short-circuit current in the place of reactor's connection point.

Current stabilization of the reactor's power winding is performed by means of changing the current of control winding according to the given current data and current value of the current, obtained from the current measuring transformers of the network winding. In this case, irrespective of voltage value in reactor's connection point, in its control winding the control current will be maintained automatically which will provide the specified current of the network winding within the admissible control range.

Stabilization of the current of rector's power winding is intended for compensation of the excess charging capacity of the transmission lines.

The design of the reactor's electromagnetic part is similar to the design of the electromagnetic part of the high-capacity power transformer, but contains two semi-limbs of the magnetic system for every phase instead of one limb for the phase of the transformer.

Electromagnetic part of the reactor comprises three windings: network winding; control winding; compensating winding.

Network winding is connected to high-voltage transmission line or bus bars of the substation and with changing of its inductance the necessary operation mode of the reactor is carried out.

Control winding is consigned for creation and changing of the magnetic flow, that changes the saturation degree for magnetic system of the reactor with passing rectified current through it. Control winding is connected to the outlets of the converter units.

Compensating winding is consigned for blanking of the third harmonic component of the reactor current as well as converter units power supply.

Example of Process of Operation

Given that at initial condition, the load power factor is equal to or greater than 0.9 on the 33 KV level of the 132/33 KV substation (it might be achieved by installing capacitor banks at lower networks LV or 11, 6.6 KV), the controlled capacitor banks on the 33 KV sides of the 132/33 KV substation will react to generate the shortage of reactive power to feed demand and bring up the lag power factor close to unity and the dropped system voltage close to nominal. On the other side at 132 KV network, the controlled shunt reactor will act whenever there is an over voltage in the system greater than the nominal system voltage or the set voltage. Over voltage is the main signal in power system indicates to availability of excessive reactive power (vars) that required to be consumed (absorbed). The MCSR will then react to absorb the surplus reactive power and bring down the system voltage to nominal and lead power factor to unity. Unity power factor is the best operation point for power system.

This shows how both elements of FACTS can function independently to maintain the system voltage stable at nominal, overall system power factor at unity and system power losses at minimal.

Suggested System Implementation and Operation Modes Between Summer Max and Winter Min at Transmission Networks The suggested setting values of FACTs will be:

MCSRs (at 132 KV sides): planned to be adjusted to 1.05 of nominal voltage (132 KV) over the year time.

Inter-Bus Transformer 132/33 KV: will be kept on manual mode with 100% tab position. In case there is any fear from over voltage on the secondary side of transformer (33 KV), the tap position can be reduced.

Automatic capacitor banks ACB (at 33 KV side): ACB control panel will receive the required initial information from the CT's and VT's of the primary sides (132 KV) of the inter-bus transformers 132/33 KV. The present values of power factors and values of imported reactive power will be determined by control relay. The reactive power compensation decision will be obtained by means of adding or removing capacitor stages in order to achieve the pre-set power factor. Since the power information are collected from primary side of transformer (132 KV), therefore it will show the demand of reactive power for both the inter-bus transformers 132/33 kV and the down stream network loads, hence the ACB will feed the required demand for both inter-bus transformers and down stream network loads.

Therefore, it is suggested that:

At summer period, ACB will be adjusted to 0.99 power factor to limit the imported power P.F. at primary terminals of IBTs to not be with less than this P.F value (0.99) in order to minimize the flow of reactive power from upper networks.

At winter period, ACB can be adjusted to lower Power factor setting like 0.97 or 0.96 to enable more consumption of reactive power generated originally from the closest transmission network 220 & 132 KV feeders in the inter-bus transformers reactance.

The setting values of MCSRs, ACBs and IBTs tap positions can be optimized after actual implementation and practical operation experience.

Applying of above reactive power control arrangement will result in a relief to upper network (Transmission and Generation) from the flow of reactive power and eliminate its associated current flow, voltage drop and real power losses.

Although the above description of the present invention has disclosed the features of the invention as applied to the preferred embodiment; additions, omissions and modifications applied to the details of the embodiment illustrated may be made by those skilled in the art without departing from the essential characteristic of the present invention.

Although the invention has been explained in relation to its preferred embodiment, it is to be understood that many other possible modifications and variations can be made without departing from the spirit and scope of the invention as herein described.

The invention claimed is:

1. A method of stabilizing voltage and reducing power losses in an electric network having a flow of live current and a flow of reactive power, the method comprising:

reducing the flow of live current by controlling the flow of reactive power within the electric network, wherein controlling the flow of reactive power comprises absorbing excess reactive power for reducing excess in voltage and reactive power flow at a first load point of the electric network, generating additional reactive power for compensating shortage in reactive power flow and improve voltage at a second load point of the electric network, the second load point being at a lower load level than the first load point, wherein the absorbing and generating of reactive power are conducted respectively using a reactive power absorber and a reactive power generator, wherein the reactive power absorber is a magnetically controlled shunt reactor (MCSR) and the reactive power generator is an automatic capacitor bank (ACB), wherein the electric network is a transmission network in connection with a power generator and in connection with a distribution network comprising a distribution substation, wherein the first load point is at a lower load level than the reactive power generator and the second load point is at a higher load level than the distribution substation, wherein the first load point and the second load point are respectively at a first transmission substation and at a second transmission substation of the electric network, wherein the first transmission substation comprises a first load bus-bar having a first voltage and a second load bus-bar having a second voltage lower than the first voltage, wherein the first load point is connected to the second load bus-bar, wherein the second transmission substation comprises a third load bus-bar having a third voltage and a fourth load bus-bar having a fourth voltage lower than the third voltage, wherein the second load point is connected to the fourth load bus-bar, and wherein the first substation has first substation transformers and the second substation has second substation transformers, wherein the MCSR absorbs excess reactive power generated naturally over feeders between the second load bus-bar and the third load bus-bar of the second transmission substation, and wherein the ACB generates additional reactive power to flow in the fourth load bus-bar in the direction of the second substation transformers and the distribution substation.

2. The method of claim 1 wherein the first transmission substation is 220/132 Kilovolts (KV) and the second transmission substation is 132/33 KV, the second voltage of the second load bus-bar being 132 Kilovolts and the fourth voltage of the fourth load bus-bar being 33 KV.

3. The method of claim 1, wherein the electric network is at least one of a transmission and distribution network.

4. An electric network node having a first load point and a second load point, the second load point being at a lower load level than the first load point, the electric network node comprising a reactive power absorber at the first load point and a reactive power generator at the second load point
wherein the reactive power absorber is a magnetically controlled reactor shunt (MCSR) and the reactive power generator is an automatic capacitor bank (ACB),
wherein the electric network node is in an electric transmission network in connection with a power generator,
wherein the first load point is at a lower load level than the reactive power generator,
wherein the electric network node is in an electric transmission network in connection with a distribution network comprising a distribution substation, wherein the second load point is at a higher load level than the distribution substation,
wherein the first load point and the second load point are respectively at a first transmission substation and at a second transmission substation of the electric transmission network,
wherein the first transmission substation comprises a first load bus-bar having a first voltage and a second load bus-bar having a second voltage lower than the first voltage, wherein the first load point is connected to the second load bus-bar,
wherein the second transmission substation comprises a third load bus-bar having a third voltage and a fourth load bus-bar having a fourth voltage lower than the third voltage, wherein the second load point is connected to the fourth load bus-bar, and
wherein the first substation has first substation transformers and the second substation has second substation transformers, wherein the MCSR absorbs excess reactive power generated naturally over feeders between the second load bus-bar and the third load bus-bar of the second transmission substation, and wherein the ACB generates additional reactive power to flow in the fourth load bus-bar in the direction of the second substation transformers and the distribution substation.

5. The electric network node of claim 4 wherein the first transmission substation is 220/132 Kilovolts (KV) and the second transmission substation is 132/33 KV, the second voltage of the second load bus-bar being 132 Kilovolts and the fourth voltage of the fourth load bus-bar being 33 KV.

6. An electric network comprising:
a first substation comprising a first load bus-bar having a first voltage and a second load bus-bar having a second voltage lower than the first voltage;
second substations in connection with the first substation, each one comprising a third load bus-bar having a third voltage equal to the second voltage and a fourth load bus-bar having a fourth voltage lower than the third voltage;
a reactive power absorber connected to the second load bus-bar, wherein the reactive power absorber is at a first load point; and
for each one of the second substations, a reactive power generator connected to the fourth load bus-bar, wherein the reactive power generator is at a second load point,
wherein said first substation is a transmission station in connection with a power generator,
wherein the first load point is at a lower load level than the reactive power generator,
wherein said second substations are transmission substations connected to distribution substations, wherein the second load point is at a higher load level than the distribution substations,
wherein the reactive power generator is an automatic capacitor bank (ACB) and the reactive power absorber is a magnetically controlled shunt reactor (MCSR), and
wherein the first substation has first substation transformers and the second substations have second substation transformers, wherein the MCSR absorbs excess reactive power generated naturally over feeders between the second load bus-bar and the third load bus-bar of the second transmission substation, and wherein the ACB generates additional reactive power to flow in the fourth load bus-bar in the direction of the second substation transformers and the distribution substation.

7. The electric network of claim 6 wherein the first substation is connected to the power generator using extra high voltage transmission lines, wherein the first substation is connected to the second substations using high voltage transmission lines, and wherein the second substations are connected to the distribution substations using medium voltage distribution lines.

8. The electric network of claim 7 wherein the first substation is 220/132 Kilovolts (KV) and the second substations are 132/33 KV, the second voltage of the second load bus-bar being 132 Kilovolts and the fourth voltage of the fourth load bus-bar being 33 KV.

9. The electric network of claim 8 wherein the transmission lines comprise over head lines (OHL) and underground (UG).

10. The electric network of claim 9 wherein the power generator comprises a generator station and a generator step-up transformer, the electric network further comprises a MCSR parallel to the generator step-up transformer for absorbing excess reactive power flowing through the generator step-up transformer towards the power generator.

* * * * *